US012245978B2

(12) United States Patent
Koenig et al.

(10) Patent No.: US 12,245,978 B2
(45) Date of Patent: Mar. 11, 2025

(54) DEVICE AND METHOD FOR REVERSIBLY CONNECTING A REHABILITATION MECHANISM TO A BED, AND METHOD FOR OPERATING A REHABILITATION MECHANISM CONNECTED TO A BED

(71) Applicant: ReActive Robotics GmbH, Munich (DE)

(72) Inventors: Alexander Koenig, Munich (DE); Helfried Peyrl, Oberhaching (DE); Ramona Susanna Schlaefer, Munich (DE); Maximilian Grosse-Dunker, Puchheim (DE); Helmut Oschwald, Munich (DE)

(73) Assignee: ReActive Robotics GmbH, Munich (DE)

( * ) Notice: Subject to any disclaimer, the term of this patent is extended or adjusted under 35 U.S.C. 154(b) by 945 days.

(21) Appl. No.: 17/295,972

(22) PCT Filed: Nov. 21, 2019

(86) PCT No.: PCT/DE2019/101001

§ 371 (c)(1),
(2) Date: May 21, 2021

(87) PCT Pub. No.: WO2020/103983

PCT Pub. Date: May 28, 2020

(65) Prior Publication Data

US 2022/0008271 A1 Jan. 13, 2022

(30) Foreign Application Priority Data

Nov. 21, 2018 (DE) ........................ 102018129370.4

(51) Int. Cl.
*A61G 7/10* (2006.01)
*A61G 7/012* (2006.01)
*A61H 1/02* (2006.01)

(52) U.S. Cl.
CPC ........... *A61G 7/1076* (2013.01); *A61G 7/012* (2013.01); *A61G 7/1044* (2013.01); *A61G 7/1046* (2013.01); *A61H 1/0237* (2013.01)

(58) Field of Classification Search
CPC ...... A61G 7/1076; A61G 7/1073; A61G 7/16; A61G 7/1036; A61G 7/012; A61G 7/005;
(Continued)

(56) References Cited

U.S. PATENT DOCUMENTS 5,319,816 A 6/1994 Ruehl
5,344,169 A 9/1994 Pryor et al.
(Continued)

FOREIGN PATENT DOCUMENTS

DE 4113135 A1 * 10/1992 ........... A61H 1/0214
DE 102015117596 B3 8/2016
(Continued)

OTHER PUBLICATIONS

English Machine Translation of DE 4113135 A1 provided by Espacenet (Year: 1992).*

*Primary Examiner* — Joseph D. Boecker
*Assistant Examiner* — Brian T Khong
(74) *Attorney, Agent, or Firm* — Laurence A. Greenberg; Werner H. Stemer; Ralph E. Locher

(57) ABSTRACT

A device and a method for reversibly connecting a rehabilitation mechanism to a bed, such as a hospital bed that can be brought to a vertical position. The device has a connection element arranged on the rehabilitation mechanism; a receiving unit, which can be arranged at the side of and/or at the foot end of the bed; the receiving unit corresponds in
(Continued)

design to the connection element; and a transport device for transporting the rehabilitation mechanism toward and away from the bed. The transport device and/or the bed is height-adjustable. A method for operating a rehabilitation mechanism connected to a bed by way of the novel device. Easy, fast, reversible connection of a rehabilitation mechanism to a conventional hospital bed is enabled, in particular to a hospital bed that can be brought to a vertical position. Existing beds can be quickly and economically retrofitted with a robot system for kinesiotherapy.

17 Claims, 10 Drawing Sheets

(58) Field of Classification Search
CPC .... A61G 7/008; A61G 7/1044; A61G 7/1046; A61G 7/08; A61G 7/1063; A61G 7/1069; A61G 12/008; A61G 12/001; A61G 2203/80; A61G 5/047; A61G 13/101; A61H 1/0237; A61H 1/0262; A61H 1/0214
See application file for complete search history.

(56) References Cited

U.S. PATENT DOCUMENTS

| | | | | |
|---|---|---|---|---|
| 5,577,279 | A | 11/1996 | Foster et al. | |
| 6,152,855 | A * | 11/2000 | Dean, Jr. | A61H 1/0262 601/24 |
| 6,685,658 | B1 | 2/2004 | Dietz et al. | |
| 7,757,316 | B2 | 7/2010 | Koch | |
| 7,845,601 | B1 | 12/2010 | Culpepper et al. | |
| 10,893,997 | B2 | 1/2021 | Koenig et al. | |
| 10,916,397 | B2 | 2/2021 | Schaar | |
| 2005/0206107 | A1 * | 9/2005 | Schubert | A61G 12/008 280/79.11 |
| 2007/0157385 | A1 * | 7/2007 | Lemire | A61G 7/0524 5/618 |
| 2018/0303696 | A1 * | 10/2018 | Koenig | A61H 1/0229 |
| 2018/0311096 | A1 | 11/2018 | Guhel et al. | |
| 2019/0183708 | A1 | 6/2019 | Koenig et al. | |

FOREIGN PATENT DOCUMENTS

| | | | |
|---|---|---|---|
| DE | 102015117593 | A1 | 4/2017 |
| DE | 102016115982 | A1 | 3/2018 |
| EP | 0966906 | A2 | 12/1999 |
| EP | 1785115 | A2 | 5/2007 |
| JP | 2003225264 | A | 8/2003 |
| JP | 2005334385 | A | 12/2005 |
| KR | 1020180100015 | A | 9/2018 |
| WO | 0061059 | A1 | 10/2000 |

* cited by examiner

DEVICE AND METHOD FOR REVERSIBLY CONNECTING A REHABILITATION MECHANISM TO A BED, AND METHOD FOR OPERATING A REHABILITATION MECHANISM CONNECTED TO A BED

BACKGROUND OF THE INVENTION

Field of the Invention

The present invention relates to a device and a method for reversibly connecting a rehabilitation mechanism to a bed, in particular to a hospital bed that can be brought to a vertical position.

The present invention further relates to a method for operating a rehabilitation mechanism connected by means of such a device to a bed, preferably to a bed that can be brought to a vertical position, said method using a control unit arranged on the transport means.

For automated kinesiotherapy of bedridden patients (understood hereinbelow in particular as patients who whether conscious or unconscious are unable, for medical reasons, to get out of bed by themselves for any length of time), various devices are known from the prior art which allow a bedridden patient to be brought from a horizontal position to an inclined position, in order thereafter, with the aid of a robot, to move the extremities, in particular the legs, of the patient automatically and under the effect of at least some of his body weight. WO 00/61069, for example, has disclosed a standing table which is adjustable in height and inclination and which has a drive mechanism for moving a leg of a patient, by means of which intensive training can be carried out for activating the centers of locomotion in the spinal cord of the patient. However, before using a standing table of this kind, a patient must first of all be transferred from his hospital bed onto such a device, which procedure, particularly in the case of intensive care patients connected to other medical apparatuses via catheters or cable connections for example, is time-consuming and causes the patient discomfort or may even be medically problematic. Moreover, DE 10 2015 117 596 B3 has disclosed a rehabilitation mechanism for bedridden patients, a method for controlling said mechanism, and a bed comprising the rehabilitation mechanism, wherein the rehabilitation mechanism has to be manually secured to a bed by a therapist and similarly removed again.

To counter this problem, mobile movement robots have therefore been developed which can be brought up to a conventional hospital bed in order to carry out kinesiotherapy and can be moved away again after the kinesiotherapy has been carried out. For example, JP 2005-334 385 A has disclosed a training device that can be pushed to the side of a hospital bed. By contrast, DE 41 13 135 A1 discloses a therapy device which, with the aid of a trolley, is moved to the foot end of a hospital bed in order to passively move the legs. In both devices, the respective movement robot remains firmly connected to the respective transport means during the kinesiotherapy, which places limits on the usability of these movement robots in the context of kinesiotherapy under the effect of body weight, as described above. DE 10 2016 115 982 A1 has disclosed a device for transferring a bed, in particular a hospital bed, from a horizontal position of its longitudinal sides to an inclined position, i.e. a device for the verticalization of a conventional bed. In one embodiment, it also provides a rehabilitation mechanism for interaction with a bedridden patient, which rehabilitation mechanism, in one configuration, can be transported with the aid of a transport means, in particular a trolley, to a stationary part of the device disclosed therein and can be operatively connected to said part. The rehabilitation mechanism is not connected here to the bed but to the receiving device of the stationary part. As a result, a bed connected to a rehabilitation mechanism according to the teaching of DE 10 2016 115 982 A1 can never be moved along with the rehabilitation mechanism but instead has the disadvantage of always being bound to the stationary part of the device.

SUMMARY OF THE INVENTION

Proceeding from this, the object of the present invention is to make available a device for mobile use of a movement robot, which device is improved in relation to the prior art and which permits the use of the respective movement robot, particularly in the context of kinesiotherapy under the influence of body weight.

This object is achieved in the first instance with the aid of a device and a method for reversibly connecting a rehabilitation mechanism to a bed, in particular to a hospital bed that can preferably be brought to a vertical position, having the features as claimed, and by a method for operating a rehabilitation mechanism connected by means of such a device to a bed, preferably to a bed that can be brought to a vertical position, having the features as claimed. Further advantageous embodiments and developments that can be used individually or in combination with one another are the subject matter of the dependent claims.

The device according to the invention comprises at least one connection element arranged on the rehabilitation mechanism; at least one receiving unit, which can be arranged at the side of and/or at the foot end of the bed; wherein the receiving unit corresponds in design to the connection element; and a transport means for transporting the rehabilitation mechanism toward the bed and away from the bed; wherein the transport means and/or the bed are/is height-adjustable; and wherein the transport means is configured in such a way that, for releasing and for fixing the rehabilitation mechanism, it interacts with the at least one receiving unit or, in the case of several receiving units, with at least one receiving unit.

The device according to the invention advantageously permits easy, fast and reversible connection of a rehabilitation mechanism to a conventional hospital bed, in particular to a hospital bed which can be brought to a vertical position and which in particular can also be adjustable in height. A movement robot or rehabilitation mechanism, which is in most cases an expensive purchase, can therefore be used for several kinesiotherapy sessions at different beds during the course of one day. Already existing beds can also be retrofitted quickly and cost-effectively by placement of a receiving unit according to the invention and can thus also advantageously be retrofitted with a robot system.

In a preferred embodiment of the invention, the device can advantageously have two connection elements arranged on the rehabilitation mechanism; and two receiving units which can preferably be arranged on different sides of a longitudinal axis of the bed. The interaction of two connection elements, arranged on the rehabilitation mechanism, with two receiving units, preferably arranged on different sides of a longitudinal axis of the bed, advantageously permits a uniform distribution of force in the region of a transverse side of the bed. In this case, the forces arising on the rehabilitation mechanism can advantageously be introduced largely directly into the receiving units on the bed, in particular on the long sides near the motors of the rehabilitation mechanism, which counteracts the occurrence of undesired leverage forces and advantageously contributes to stabilizing the connection between bed and rehabilitation mechanism. In addition, a longitudinal arrangement of the receiving units or the connection elements permits both the reception of the rehabilitation mechanism near the center of gravity of the transport means, preferably a trolley, and also the arrangement of the rehabilitation mechanism on the bed near a center of gravity of the rehabilitation mechanism, which in turn advantageously increases the stability of the whole arrangement in the operating state.

In a further preferred embodiment, for connecting the rehabilitation mechanism to the bed and/or for removing the rehabilitation mechanism from the bed, the transport means can be configured to interact with the at least one receiving unit or, in the case of several receiving units, with at least one receiving unit. A transport means configured in this way advantageously permits the automatic locking and unlocking of the one or more connection elements in the at least one receiving unit or, in the case of several receiving units, in at least one receiving unit, by interaction of the transport means with a receiving unit, without the need for further intervention by third parties, and thus advantageously increases the operational safety, in particular during the connection procedure.

In addition, it has proven expedient that, at the transverse side of the bed, a connection frame is arranged extending at least along a portion of the transverse side, which connection frame firmly connects two receiving units to each other, and/or which connection frame is mounted pivotably about a pivot axis with respect to the one or more receiving units.

It is advantageous if the connection frame comprises, preferably centrally with respect to its longitudinal extent, at least one locking plate. A connection frame of this kind advantageously makes it possible on the one hand, in the case of two receiving units, to fix these at a set distance from each other and thereby obtain an autonomous structural unit which, for example for retrofitting a conventional hospital bed as a whole, can be mounted on the respective bed. On the other hand, a connection frame which is mounted pivotably about a pivot axis relative to the one or more receiving units advantageously permits the interaction between the transport means and the one or more receiving units by coming into contact with the transport means. If the connection frame also comprises at least one locking plate, the interaction between the transport means and the one or more receiving units can advantageously be triggered by moving the transport means toward the bed and/or by exerting pressure on the locking plate by the transport means.

It has also proven expedient if the at least one receiving unit or, in the case of several receiving units, at least one receiving unit comprises a locking device which is configured to come into operative connection with the connection frame. If the receiving unit comprises a locking device of this kind, a locking and unlocking of the receiving unit can advantageously be triggered by acting on the connection frame, in particular on the locking plate of the latter.

In a further preferred embodiment, it has proven expedient that the at least one receiving unit or, in the case of several receiving units, at least one receiving unit has an opening, preferably tapering toward the floor, for receiving a connection element of the rehabilitation mechanism. By way of this opening or these openings, the rehabilitation mechanism can be connected stably, but reversibly, to the bed with the aid of its connection element or connection elements. An opening tapering toward the floor and thus comparatively wider at the top of the receiving unit advantageously allows the connection elements to be easily "threaded" into the receiving units when the rehabilitation mechanism is moved toward the respective bed by the transport means, wherein advantageously a further tolerance range for the orientation of the rehabilitation mechanism is created during the connection procedure, both in the transverse direction and in the event of any inclination (transverse side of the bed to the transverse side of the rehabilitation mechanism). The tapering of the opening or openings also advantageously affords a kind of self-centering mechanism for the rehabilitation mechanism and advantageously defines the position thereof in relation to the bed, such that the connection procedure is made easier for the user.

It is also advantageous if the opening, on its inner face directed toward the bed, is made of a plastic and/or is coated with a plastic. The inner wall of an opening of this configuration advantageously reduces the friction between connection element and receiving unit during the connection procedure and can thereby reduce the mechanical wear of the components, with no further lubrication being necessary. In addition, an inner wall coated with a plastic such as polytetrafluoroethylene (Teflon®) or formed from a plastic such as polytetrafluoroethylene (Teflon®) reduces any noise caused by friction during the connection procedure and thus predestines the device according to the invention for use in sensitive hospital areas.

It is also advantageous if the locking device comprises at least one stamp element and a spring element, wherein the stamp element is designed for operative connection to the connection frame and to the connection element of the rehabilitation mechanism, and wherein the spring element is designed to interact with the stamp element. A locking device of this kind advantageously forms a self-locking, "always-locked" mechanism which secures the rehabilitation mechanism, in particular when the bed is in an inclined position, i.e. during verticalization, against slipping out of the receiving unit. The spring element can advantageously remain load-free, since the force exerted on the bed by the rehabilitation mechanism is diverted via the one or more stamp elements.

In a further embodiment of the invention, it has proven expedient that at least one receiving unit has at least one means for exchanging information with a verticalization mechanism of a bed, which is configured to interact directly or indirectly with a connection element of a rehabilitation mechanism. The means for exchanging information can advantageously indicate, to the verticalization mechanism of the bed, the status of the connection between the rehabilitation mechanism, in particular the connection elements thereof, and the one or more receiving units and can thus only enable a verticalization movement of the bed when there is a stable connection. This advantageously serves to avoid errors and thus enhances patient safety.

In addition, an embodiment has proven expedient in which the transport means is configured in such a way that, for releasing and fixing the rehabilitation mechanism, it can interact with the connection frame, specifically additionally with the at least one receiving unit or, in the case of several receiving units, with at least one receiving unit. A transport means configured in this way advantageously ensures that the locking mechanism of the locking device is actuated only when the transport means has been moved close enough to the bed in order to guarantee a connection procedure or release procedure being carried out safely.

In a further preferred embodiment, the transport means can preferably at least comprise a rigid or height-adjustable support frame for supporting the rehabilitation mechanism; and trigger means for interacting directly or indirectly with the at least one receiving unit or, in the case of several receiving units, with at least one receiving unit. A height-adjustable support frame advantageously allows height differences to be compensated for by the transport means, whatever the respective hospital bed. The respective hospital bed can remain passive, which advantageously saves on any communication devices between the bed and the transport means. A rigid support frame advantageously makes it possible to provide a transport means without any lever mechanism, which accordingly cuts down on costs and outlay. Since many hospital beds are in any case adjustable in height, the transport means can remain passive, which once again advantageously saves on any communication devices between the bed and the transport means. Finally, however, the transport means and the bed can also each be designed to be adjustable in height. Distances traveled in height can then advantageously be divided up, which again permits savings in terms of the lever mechanisms, even if communication devices between the bed and the transport means may possibly represent an additional requirement in such designs.

Finally, an embodiment of the device has proven expedient in which the transport means preferably comprises at least one means for centering the transport means with respect to the bed; a holding element for interacting with an anti-tipping device of a rehabilitation mechanism; and/or a control unit which is configured to exchange control signals with the rehabilitation mechanism. A means for centering the transport means advantageously facilitates rapid movement of the rehabilitation mechanism toward the bed and into a position, with respect to the transverse side of the bed, that is suitable for the connection procedure. A holding element advantageously prevents the rehabilitation mechanism from tipping forward, in particular during transport on the transport means. Finally, if the transport means comprises a control unit, the rehabilitation mechanism can advantageously be controlled from the transport means without the need for further control devices.

The method according to the invention for reversibly connecting a rehabilitation mechanism to a bed, in particular to a hospital bed that can be brought to a vertical position, is distinguished from other methods of the type in question in that

- a rehabilitation mechanism is arranged on a transport means and is transported in a transport position to a bed;
- the rehabilitation mechanism is moved into a first connection position with the aid of a height-adjustable transport means and/or a height-adjustable bed;
- the rehabilitation mechanism is moved from the first connection position to a second connection position with the aid of the transport means and/or the height-adjustable bed,
  - wherein the transport means interacts with at least one receiving unit, which can be arranged at the side of and/or at the foot end of the bed, in order to unlock the receiving unit;
- the rehabilitation mechanism is moved from the second connection position to a third connection position with the aid of the height-adjustable transport means and/or the height-adjustable bed;
  - wherein at least one connection element arranged on the rehabilitation mechanism comes into operative connection with the at least one receiving unit or, in the case of several receiving units, with at least one receiving unit;
- the height-adjustable transport means and/or the height-adjustable bed is moved from the third connection position to the transport position; and
- the transport means is moved away from the bed.

The method according to the invention advantageously permits easy, fast and reversible connection of a rehabilitation mechanism to a conventional hospital bed, in particular to a hospital bed that can be brought to a vertical position, and ensures the greatest possible safety for the user at each step of the method.

Finally, the invention also relates to a method for operating a rehabilitation mechanism connected to a bed, in particular a hospital bed that can be brought to a vertical position, by means of a device as described above, wherein the transport means comprises at least one control unit which is configured to exchange control signals with the rehabilitation mechanism (30); and wherein at least one receiving unit has at least one means for exchanging information with a verticalization mechanism of a bed, which is configured to interact directly or indirectly with a connection element of the rehabilitation mechanism.

The operating method according to the invention is distinguished from other operating methods of the type in question in that the rehabilitation mechanism exchanges control data with a verticalization mechanism of the bed via a direct interaction between at least one connection element arranged on the rehabilitation mechanism and at least one receiving unit which can be arranged at the side of and/or at the foot end of the bed. Alternatively, the operating method according to the invention is distinguished from other operating methods of the type in question in that the rehabilitation mechanism exchanges control data with a verticalization mechanism of the bed, and with a control unit arranged on the transport means, via a direct interaction between at least one connection element arranged on the rehabilitation mechanism and at least one receiving unit which can be arranged at the side of and/or at the foot end of the bed. The operating method according to the invention advantageously permits a coordinated, user-friendly control of the rehabilitation mechanism and optionally of the verticalization mechanism and, if present, of a lifting mechanism of the bed, directly from the transport means, without the need for further devices.

Additional details and further advantages of the invention are described below on the basis of preferred illustrative embodiments, to which the invention is not limited however, and in conjunction with the attached schematic drawings, in which:

DETAILED DESCRIPTION OF THE INVENTION

In the following description of preferred embodiments of the present invention, identical reference signs designate the same or comparable components.

Figure 1A:
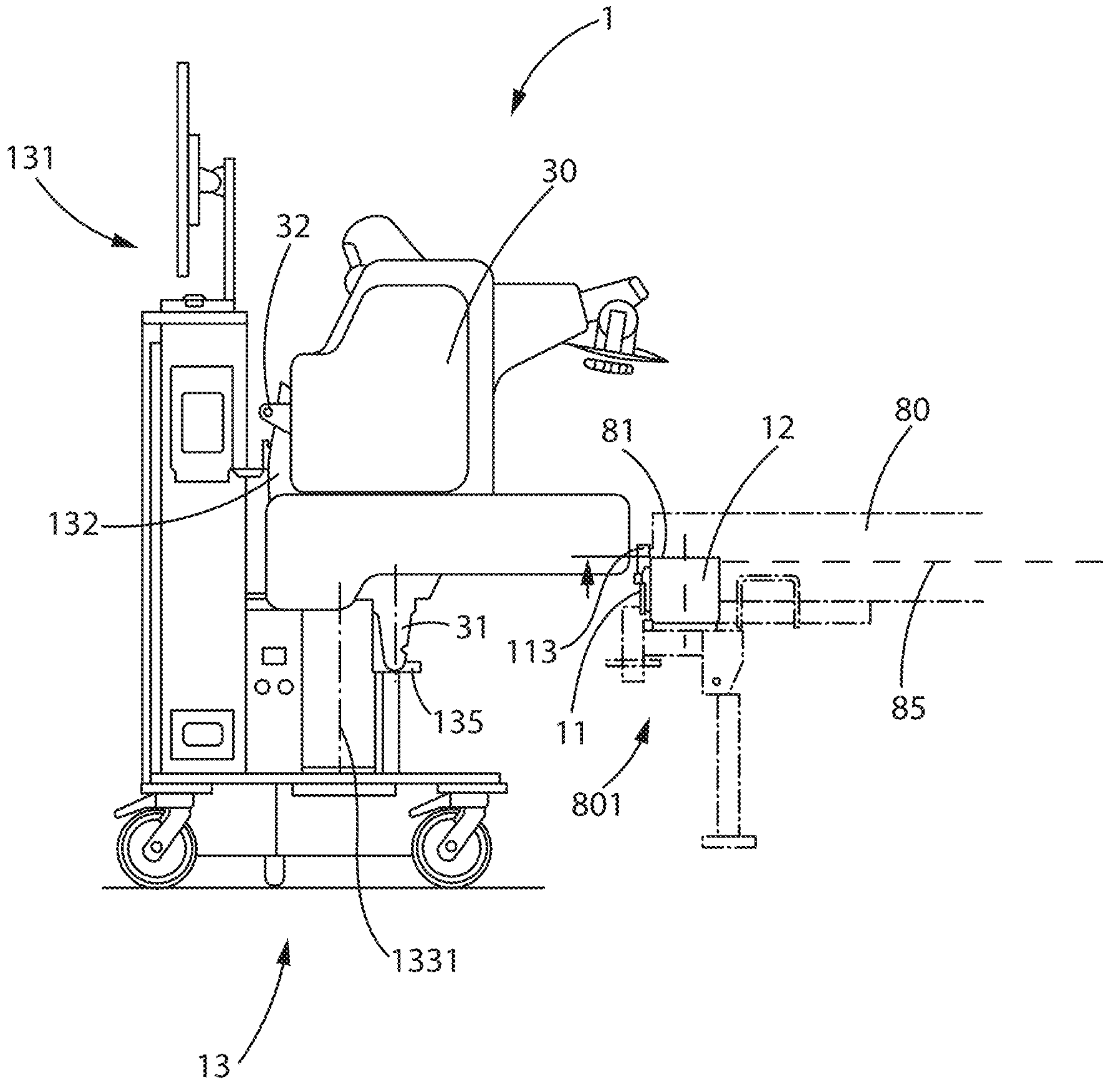
FIG. 1*a* shows a side view of an embodiment of a device according to the invention.
Figure 1B:
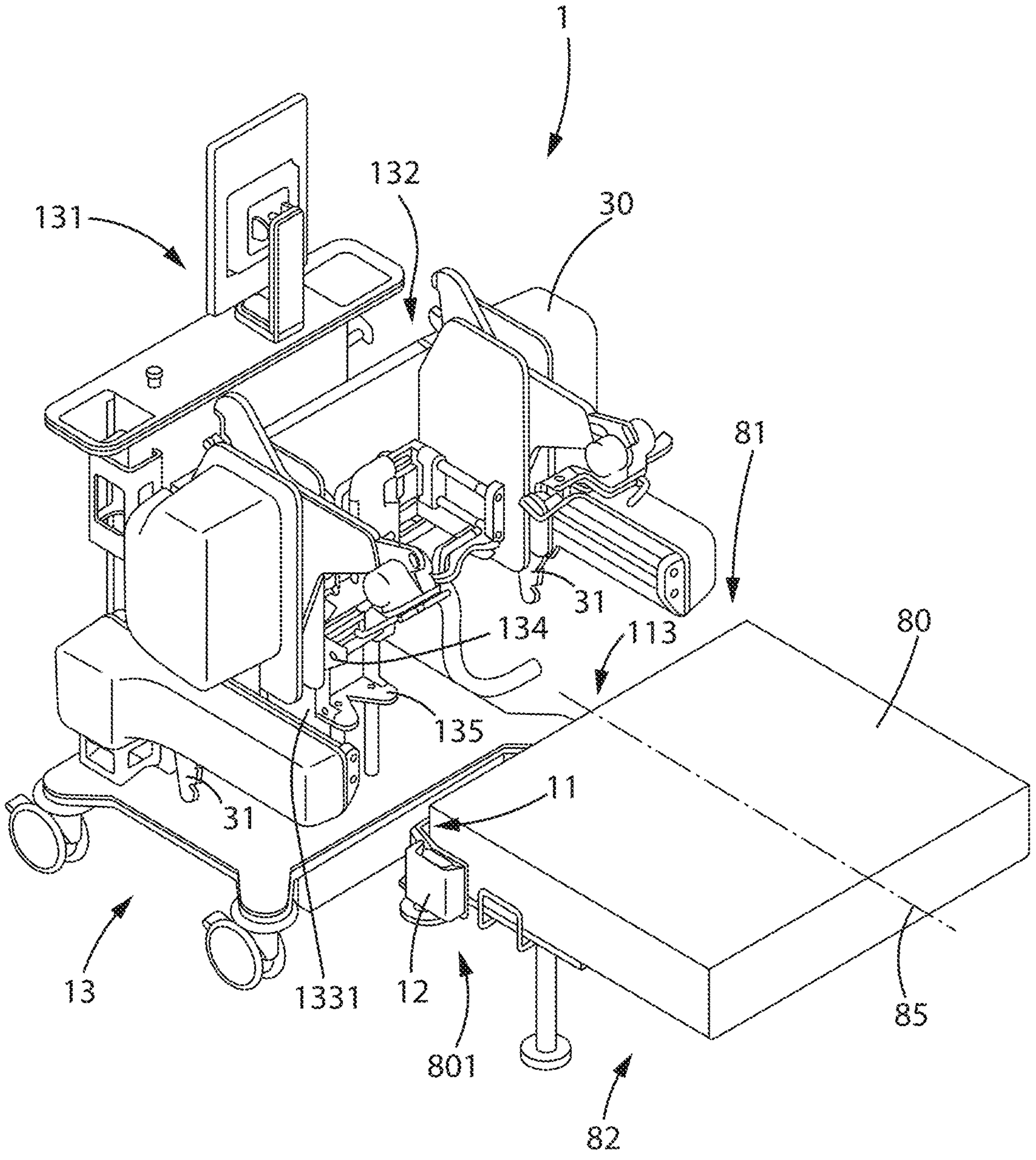
FIG. 1*b* shows a perspective view of the device from FIG. 1*a;*

FIG. 1*a* shows a side view of an embodiment of a device 1 according to the invention; FIG. 1*b* shows the device from FIG. 1*a* in a perspective view. The device 1 shown comprises at least one connection element 31 arranged on the rehabilitation mechanism 30, shown here for example as a connection blade, and at least one receiving unit 12 which can be arranged at the foot end 801 of the bed 80; wherein the receiving unit 12 is designed corresponding to the connection element 31, in particular the connection blade. The device 1 can preferably also comprise two connection elements 31 arranged on the rehabilitation mechanism 30; and two receiving units 12 which can preferably be arranged on different sides of a longitudinal axis 85 of the bed 80.

Moreover, a device 1 according to the invention comprises at least one transport means 13 for transporting the rehabilitation mechanism 30 toward the bed 80 and away from the bed 80, wherein the transport means 30 and/or the bed 80 can be designed to be adjustable in height; and wherein the transport means 13 can be configured in such a way that, for releasing and for fixing the rehabilitation mechanism, it interacts with the at least one receiving unit or, in the case of several receiving units, with at least one receiving unit. The transport means 13 can advantageously be designed for example as a trolley, with the aid of which the rehabilitation mechanism 30 can be moved comfortably and without great effort. The transport means 13, in particular the trolley, can advantageously comprise a height adjustment device 1331, preferably a telescopic device, whereby the rehabilitation mechanism 30, while being moved and also when being parked far from a bed 80, can advantageously be brought into a comparatively low position close to the floor and thus, in the system composed of transport means 13 and rehabilitation mechanism 30, a comparatively low center of gravity can be generated in order thereby to advantageously increase the safety against tipping of the entire system. Alternatively, the transport means 13 or the trolley can also be of a rigid design, particularly when used with height-adjustable beds 80.

Figure 2:
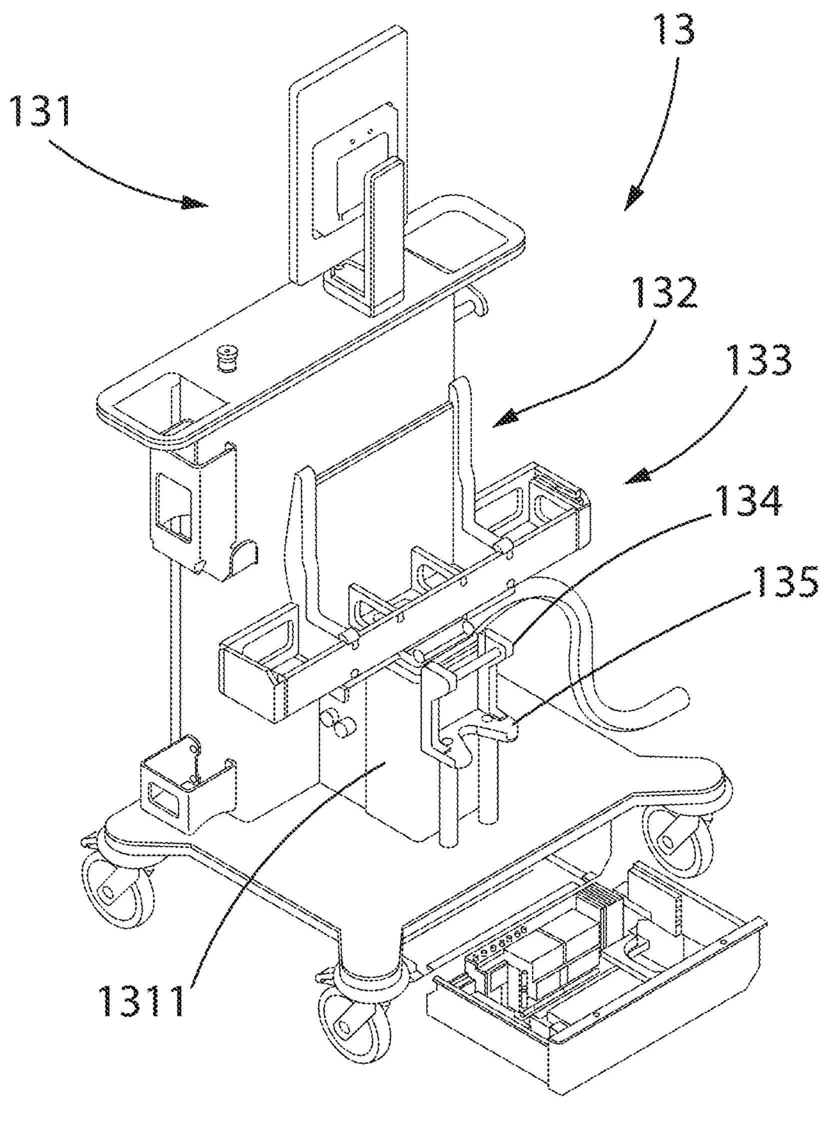
FIG. 2 shows a perspective view of an embodiment of a transport means according to the invention.

FIG. 2 shows a perspective view of an embodiment of a transport means 13 according to the invention. It is advantageous if the transport means 13 is configured for connecting the rehabilitation mechanism 30 to the bed 80 and/or for removing the rehabilitation mechanism 30 from the bed 80 by interacting with the at least one receiving unit 12 or, in the case of several receiving units 12, with at least one receiving unit 12, particularly for releasing and for fixing the rehabilitation mechanism 30 by interacting with the connection frame 11 and/or the at least one receiving unit 12 or, in the case of several receiving units 12, with at least one receiving unit 12. For this purpose, a trigger means 134 can preferably be arranged on the transport means 13, for directly or indirectly interacting with the at least one receiving unit 12 or, in the case of several receiving units 12, with at least one receiving unit 12. As is shown in FIG. 2, the trigger means 134 can be arranged below a support frame 133 on the transport means 13. In addition, the transport means 13 can advantageously comprise a means 135 for centering the transport means 13 with respect to the bed 80, which means 135 is preferably also arranged below a support frame 133 on the transport means 13 and advantageously has a V-shaped or U-shaped design, such that it can interact with a part of the bed 80. In addition, there may also advantageously be arranged on the transport means 13 a holding element 132 for interaction with an anti-tipping device 32 of a rehabilitation mechanism 30, and/or a control unit 131 which is configured to exchange control signals with the rehabilitation mechanism 30.

Figure 3:
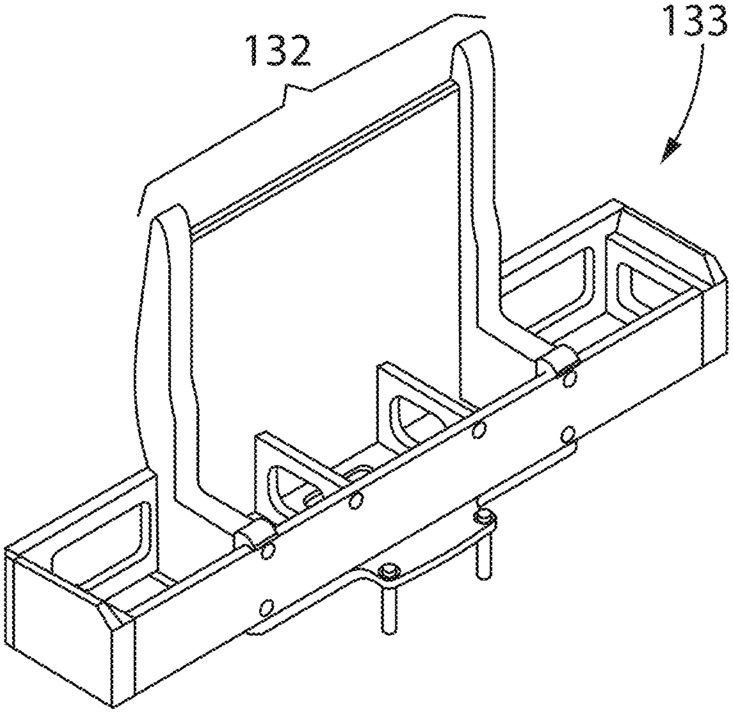
FIG. 3 shows a support frame of the transport means from FIG. 2, in an enlarged perspective view.

FIG. 3 shows an enlarged perspective view of a support frame 133 of the transport means 13 from FIG. 2. The support frame 133 shown here, on which the rehabilitation mechanism 30 can be supported at least in part during the transport, preferably comprises a holding element 132 for an anti-tipping device 32, which can in turn be arranged on the rehabilitation mechanism 30, preferably on the rear face of the latter (cf. FIG. 1).

Figure 4A:
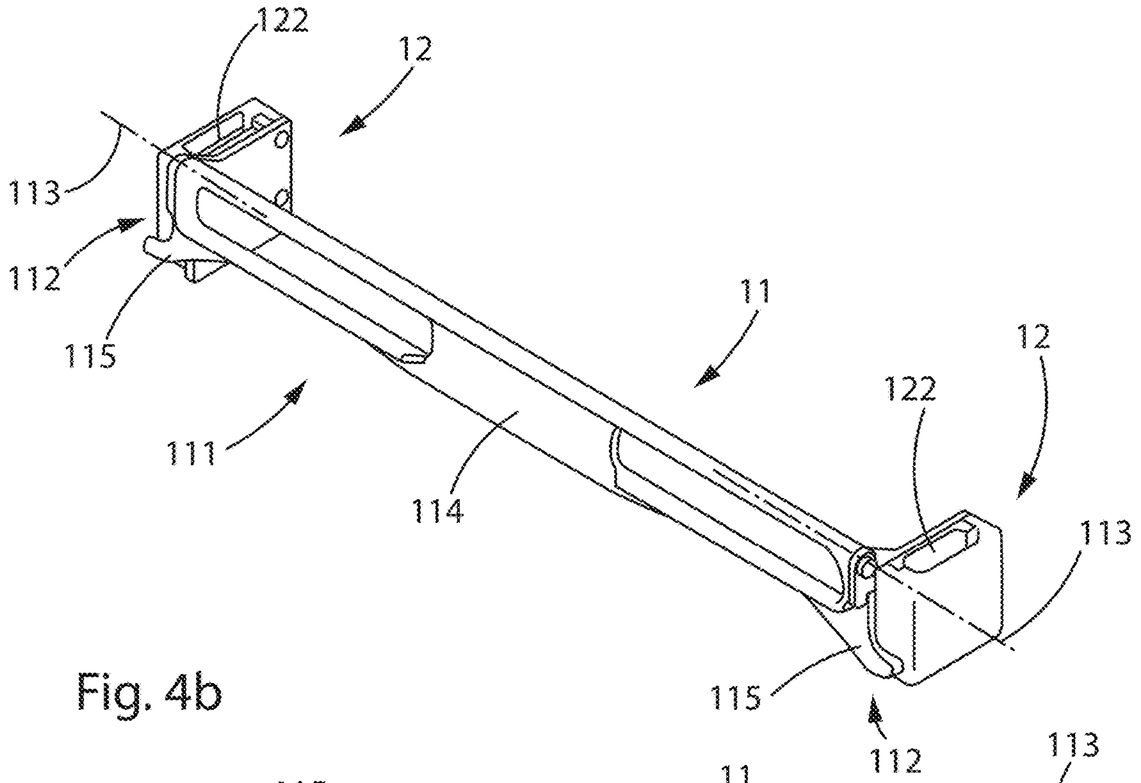
FIG. 4*a* shows a perspective view of an embodiment of a connection frame with two receiving units arranged thereon.
Figure 4B:
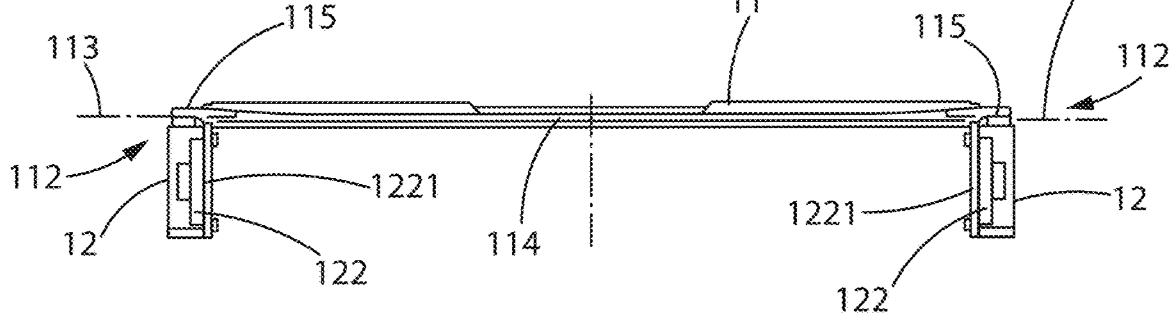
FIG. 4*b* shows a plan view of the connection frame and the receiving units from FIG. 4*a;*
Figure 4C:
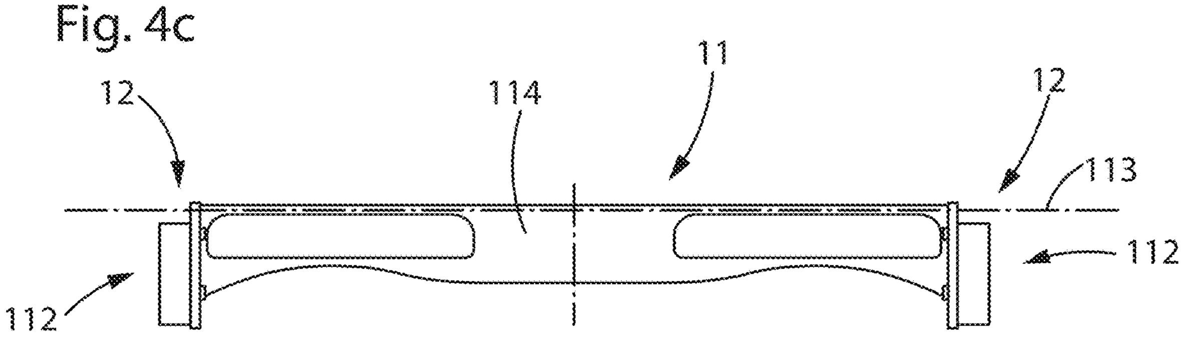
FIG. 4*c* shows a rear view of the connection frame and the receiving units from FIG. 4*a;*

FIGS. 4*a* to 4*c* show an embodiment of a connection frame 11, with two receiving units 12 arranged thereon, in a perspective view (FIG. 4*a*), in a plan view (FIG. 4*b*) and in a rear view (FIG. 4*c*). The connection frame 11 shown here advantageously connects two receiving units 12 firmly to each other, as a result of which a type of module is formed. In addition, the connection frame 11 is mounted pivotably relative to the two receiving units 12 about a pivot axis 113. Alternatively to this, the at least one receiving unit 12 or the two receiving units 12 or the connection frame 11 can also be individually arranged (not shown) on the bed 80, preferably at the side of and/or at the foot end 801 thereof. In the case of a modular set-up, as is shown in FIGS. 4*a* to 4*c*, the whole module can then preferably be arranged at the transverse side 81 of the bed 80. The connection frame 11 advantageously extends at least along a portion of the transverse side 81, preferably along the entire transverse side 81. As can be seen in particular in FIG. 4*a*, the connection frame 11 can advantageously comprise at least one locking plate 114, which is preferably arranged centrally with respect to the longitudinal extent of the connection frame 11. It is additionally advantageous if one or more wing elements 115 are arranged on one or both transverse sides 112 of the connection frame 11 (cf. FIG. 4*a*).

Figure 5A:
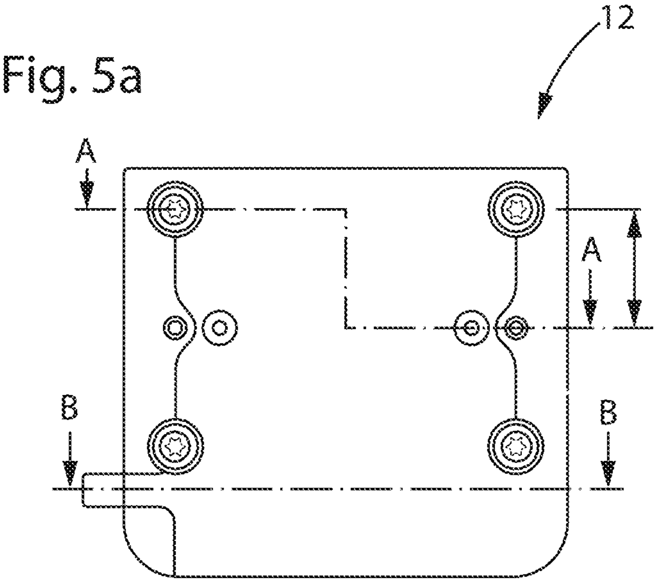
FIG. 5*a* shows an embodiment of a receiving unit in a side view.
Figure 5B:
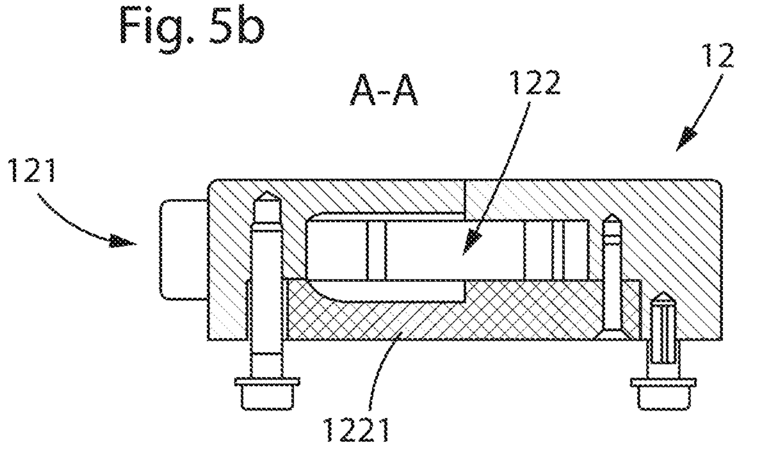
FIG. 5*b* shows a section along A-A through the receiving unit from FIG. 5*a;*
Figure 5C:
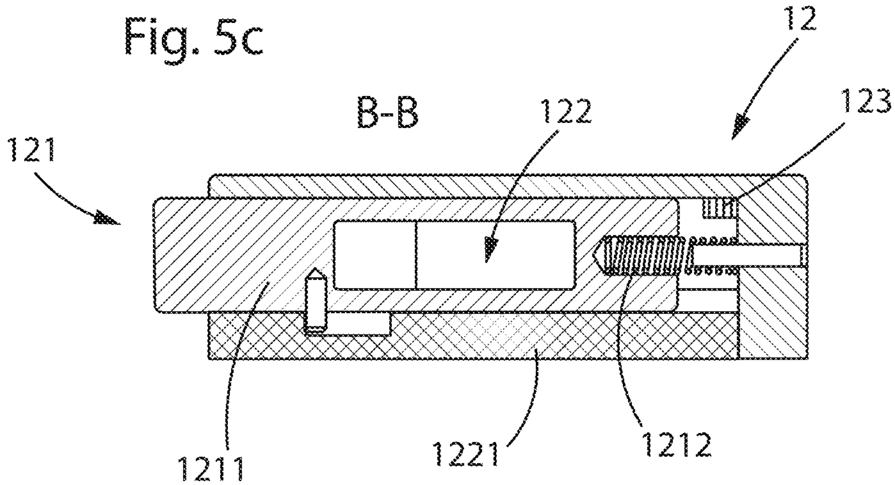
FIG. 5*c* shows a section along B-B through the receiving unit from FIGS. 5*a* and 5*b;*

FIGS. 5*a* to 5*c* show an embodiment of a receiving unit 12 in a side view (FIG. 5*a*), as a section along A-A through the receiving unit 12 (FIG. 5*b*), and as a section along B-B through the receiving unit 12 (FIG. 5*c*).

It will be seen that the at least one receiving unit 12 or, in the case of several receiving units 12, at least one receiving unit 12 can have an opening 122, preferably tapering toward the floor, for receiving a connection element 31 of the rehabilitation mechanism 30. The opening 122, preferably on its inner face 1221 directed toward the bed, can be made of a plastic, in particular Teflon®, and/or can be coated with a plastic, in particular Teflon®. The receiving unit 12 shown here additionally comprises a locking device 121 which has at least one stamp element 1211 and a spring element 1212. It will be seen in FIG. 5*c* that the stamp element 1211 can be designed, for example, as an approximately rectangular, preferably solid component which, preferably in the direction of the opening 122 of the receiving unit 12 itself, has an in particular elongate opening through which a connection element 31, preferably designed as a connection blade, can pass. In this way, the stamp element 1211 can advantageously come into operative connection with the connection element 31. Moreover, one end of the stamp element 1211, in particular the end directed away from the bed 80, can advantageously emerge through a further, lateral opening of the receiving unit 12 and is thus accessible for operative connection to the connection frame 11, preferably to the wing element or wing elements 115 thereof. Moreover, at the other end of the stamp element 1211, preferably at the end directed toward the bed 80, a spring element 1212 can advantageously be arranged which is designed to interact with the stamp element 1211, preferably by virtue of the fact that it is able to push the stamp element 1211 out of the lateral opening of the receiving unit 12 when no opposing force is exerted on the stamp element 1211 and thus on the spring element 1212.

The receiving unit 12 or, in the case of several receiving units 12, at least one receiving unit 12 can additionally have at least one means 123 for exchanging information with a verticalization mechanism of a bed 80, which means 123 is configured to interact directly or indirectly with a connection element 31 of a rehabilitation mechanism 30. Such a means 123 for information exchange can be, for example, a sensor which detects the position of the stamp element 1211 inside the receiving unit 12 and supplies a verticalization mechanism, which can be integrated in the bed 80, independently with information as to whether a rehabilitation mechanism 30 is or is not properly connected to the receiving unit 12. This information can advantageously increase patient safety by avoiding an uncontrolled start of a verticalization procedure.

Figure 6:
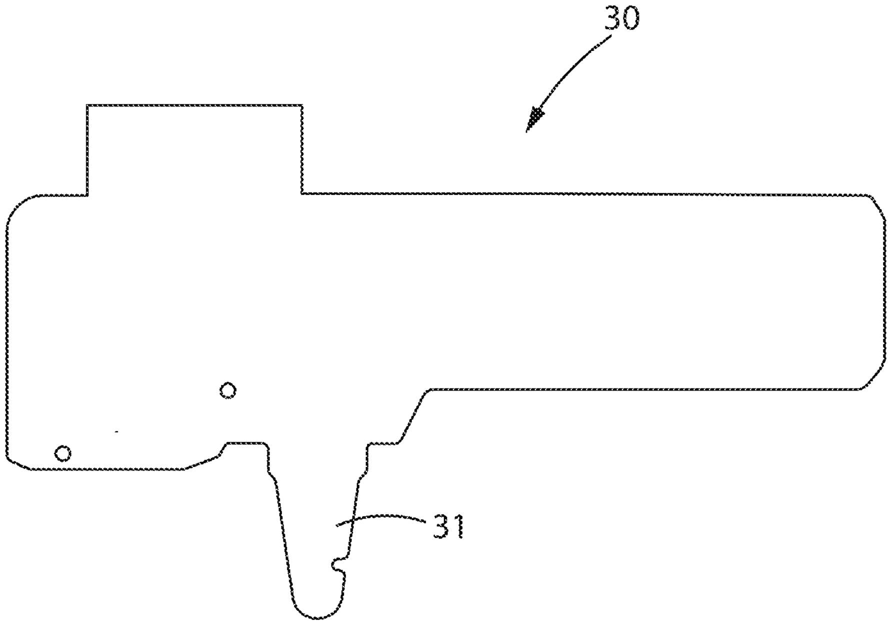
FIG. 6 shows a side view of part of an embodiment of a rehabilitation mechanism with a connection element arranged thereon.

FIG. 6 shows a side view of part of an embodiment of a rehabilitation mechanism 30 with a connection element 31 arranged thereon. The connection element 31 is designed here as a so-called connection blade, which can be inserted into the opening 122 of the respective receiving unit 12 and, on account of its shape, likewise tapering toward the floor, moves virtually by itself into a suitable position inside the opening 122 during the connecting process. The connection element 31 shown here also has a notch, which serves to strengthen the interaction with the stamp element 1211, in particular a "locking", preferably by form-fit engagement.

Finally, FIGS. 7*a* to 7*f* show a series of images illustrating an exemplary sequence of the method according to the invention for reversibly connecting a rehabilitation mechanism 30 to a bed 80.

Figure 7A:
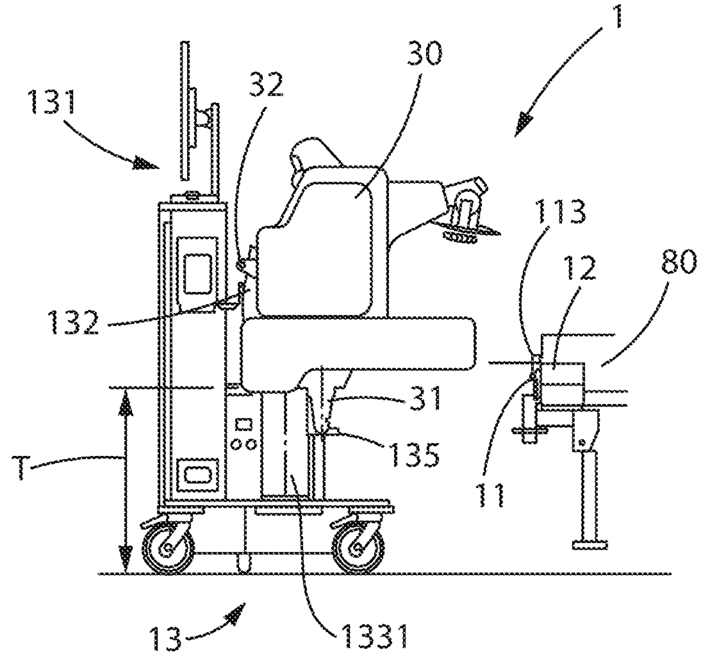
FIGS. 7*a* to 7*f* show a series of images illustrating a first exemplary sequence of the method according to the invention for reversibly connecting a rehabilitation mechanism to a bed.

In a first method step, a rehabilitation mechanism 30 is arranged on a height-adjustable transport means 13 and is transported in a transport position T to a bed 80 (FIG. 7*a*). The distance of the rehabilitation mechanism 30 from the floor in this transport position T is preferably chosen to be small, so that the center of gravity of the system composed of rehabilitation mechanism 30 and transport means 13 is as low as possible, i.e. in particular close to the floor. In this transport position T, the rehabilitation mechanism 30 is preferably carried by a support frame 133 and, by means of a holding element 132 arranged on the transport means 13 engaging in the anti-tipping device 32 arranged on the rehabilitation mechanism, is secured against tipping downward during transport.

Figure 7B:
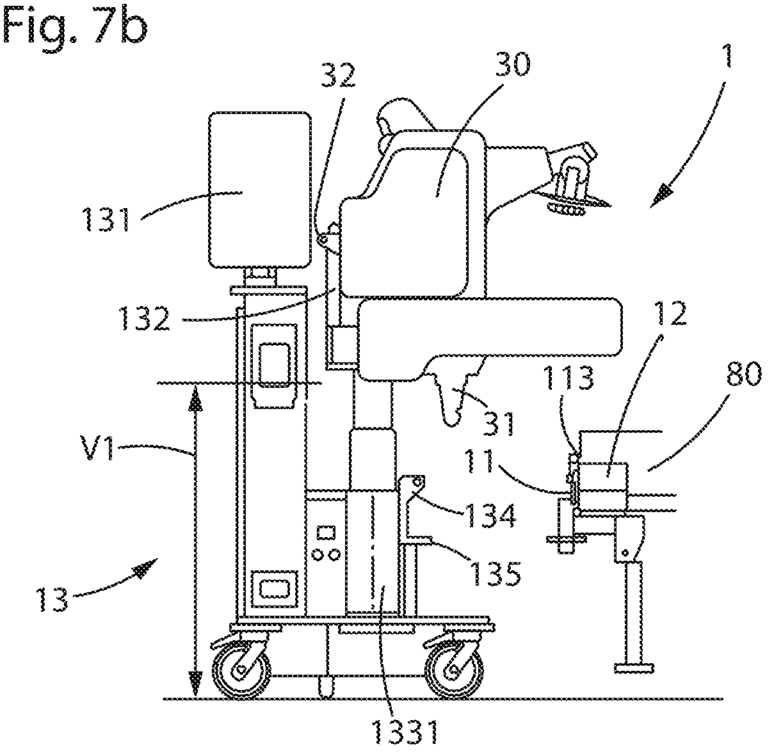

In a further method step, the rehabilitation mechanism 30 is moved, with the aid of the height-adjustable transport means 13, from the transport position T into a first connection position V1 (FIG. 7*b*). For this purpose, the rehabilitation mechanism 30 is preferably brought to a height, preferably with the aid of a height adjustment device 1331, in particular with a telescopic device, such that connection elements 31 arranged on the rehabilitation mechanism 30 can be inserted from above into receiving units 12 arranged on the bed 80.

Figure 7C:
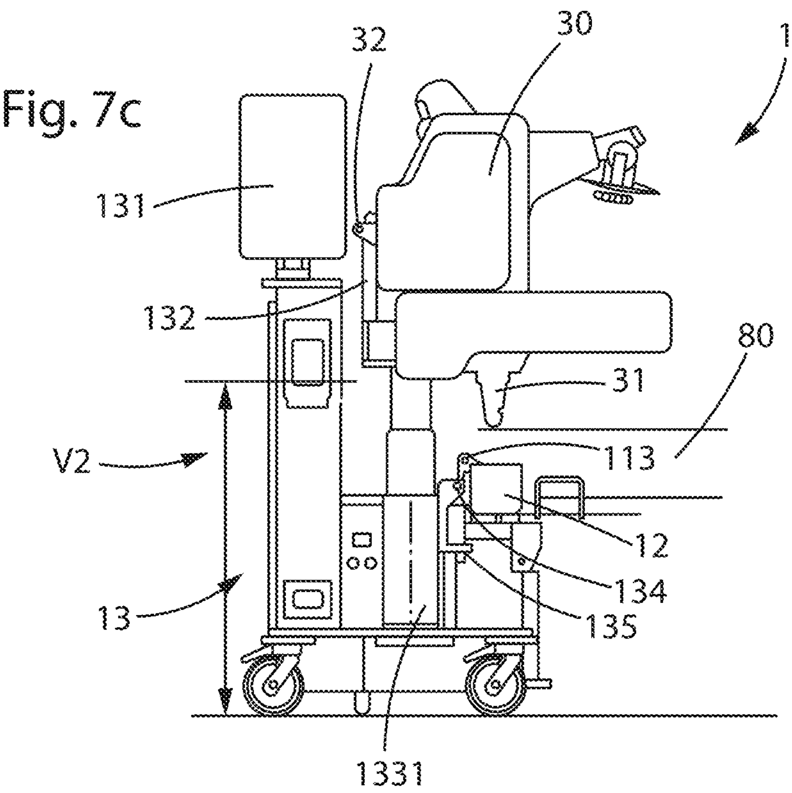

In a further method step, the rehabilitation mechanism 30 is moved, with the aid of the height-adjustable transport means 13, from the first connection position V1 into a second connection position V2 (FIG. 7*c*). The transport means 13 interacts here with at least one receiving unit 12, which can be arranged at the side of and/or at the foot end 801 of the bed 80, so as to unlock the receiving unit 12, by virtue of the fact that, when a trigger means 134 arranged on the transport means 13 approaches the bed 80, it presses against a connection frame 11 arranged on the bed 80, in particular against the locking plate 114 arranged thereon. Wing elements 15 arranged on the connection frame 11 can advantageously interact with a locking device 121 of the receiving unit 12, in particular with the stamp element 1211 of the locking device 121, and can release the receiving unit 12 for connection to the connection element 31 or connection elements 31 of the rehabilitation mechanism 30.

Figure 7D:
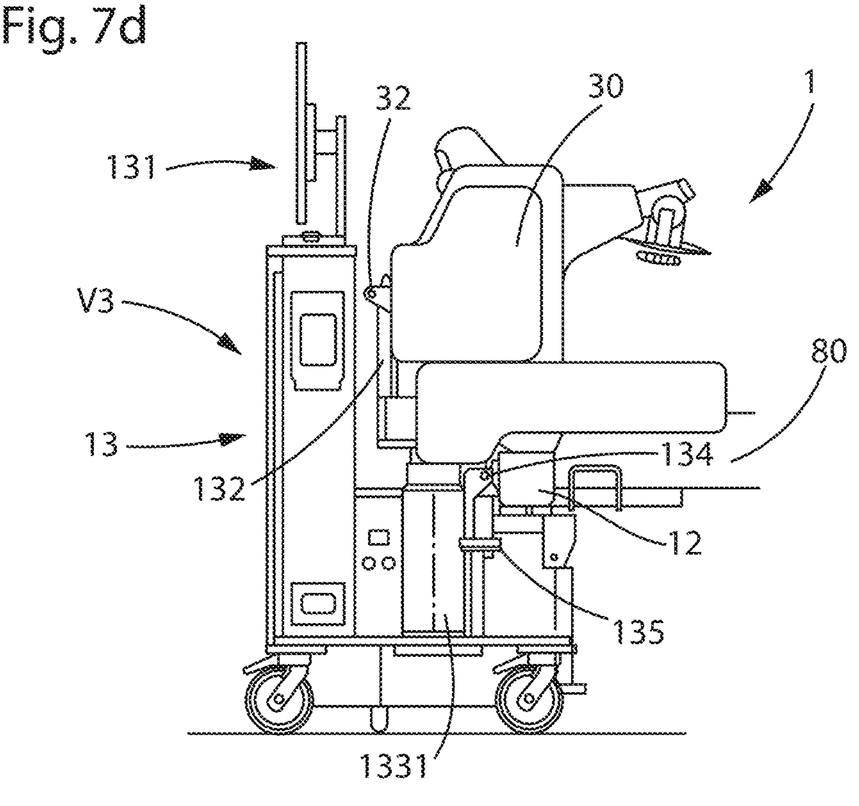
Figure 7E:
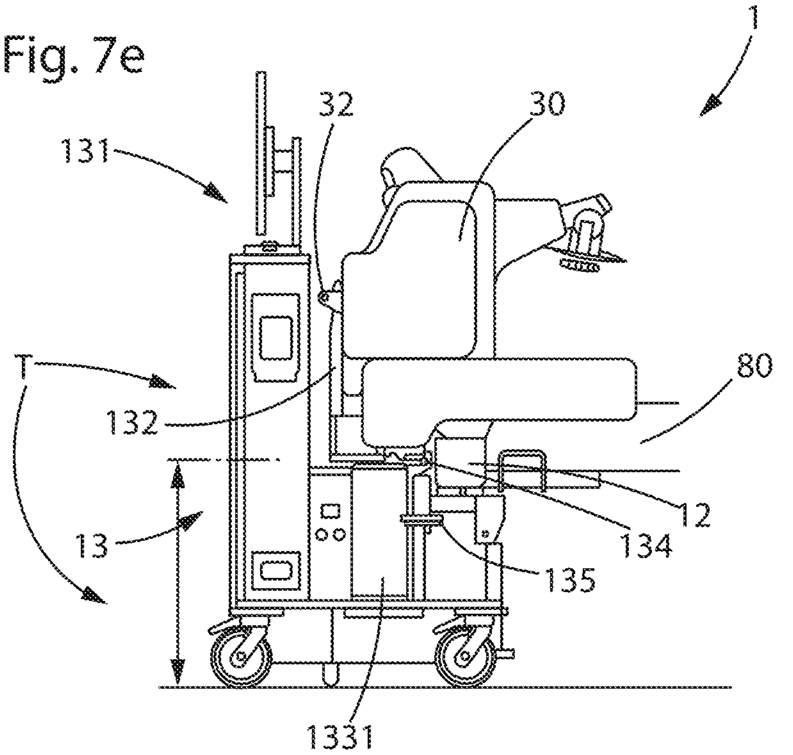

In a further method step, the rehabilitation mechanism 30 is moved, with the aid of the height-adjustable transport means 13, from the second connection position V2 into a third connection position V3, wherein at least one connection element 31 arranged on the rehabilitation mechanism 30 comes into operative connection with the at least one receiving unit 12 or, in the case of several receiving units 12, with at least one receiving unit 12 (FIG. 7*d*).

Figure 7F:
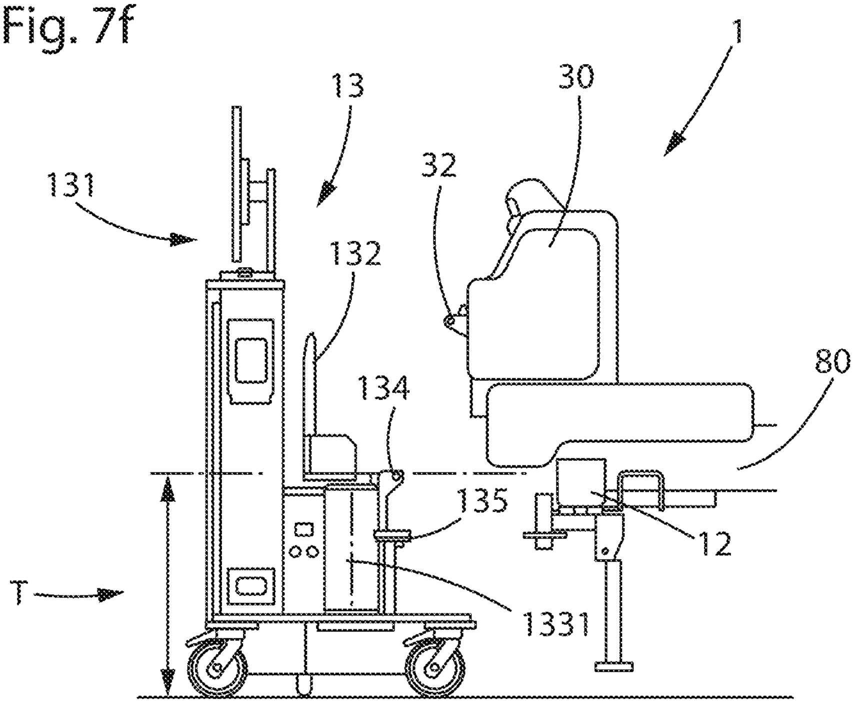

Finally, in one method step, the height-adjustable transport means 13 is moved from the third connection position V3 to the transport position T (FIG. 7*e*); and, in a last method step, the height-adjustable transport means 13 is moved away from the bed 80 (FIG. 7*f*). While the transport means 13 moves away from the bed 80, the pressure exerted by the trigger means 134 on the locking device 121, in particular on the stamp element 1211 thereof, also decreases, and a spring element 1212 preferably arranged in the receiving unit 12 can move the stamp element 1211 back to its starting position (locking position) and thus fix the rehabilitation mechanism 30 in the receiving unit or units 12. For uncoupling the rehabilitation mechanism 30 from the bed 80, the described method steps can preferably be carried out in the reverse order.

In a second example of the sequence of the method according to the invention for reversibly connecting a rehabilitation mechanism 30 to a bed 80, which is not explicitly shown here, it is alternatively or additionally possible for a height-adjustable bed 80 to be lowered to a height, such that connection elements 31 arranged on the rehabilitation mechanism 30 can be inserted from above into receiving units 12 arranged on the bed 80. Height-adjustable beds advantageously also permit the use of rigid and therefore cost-effective transport means 13.

For this purpose, in one method step, a rehabilitation mechanism 30 can be arranged on a transport means 13 and transported in a transport position T to a bed 80. A height-adjustable bed 80 can then be moved to a first connection position V1. In a further method step, the height-adjustable bed 80 can be moved from the first connection position V1 to a second connection position V2, wherein the transport means 13 interacts with at least one receiving unit 12, which can be arranged at the side of and/or at the foot end 801 of the bed 80, so as to unlock the receiving unit 12. The height-adjustable bed 80 can now be moved from the second connection position V2 into a third connection position V3, wherein at least one connection element 31 arranged on the rehabilitation mechanism 30 comes into operative connection with the at least one receiving unit 12 or, in the case of several receiving units 12, with at least one receiving unit 12. Finally, in a last method step, the height-adjustable bed 80 can be moved from the third connection position V3 to the transport position T, and then the transport means 13 can be moved away from the bed 80.

To operate the device 1 in a method according to the invention for reversible connection as described above, the rehabilitation mechanism 30, by direct interaction between at least one connection element 31 arranged on the rehabilitation mechanism 30 and at least one receiving unit 12 that can be arranged at the side of and/or at the foot end 801 of the bed 80, is able to exchange control data with a verticalization mechanism of the bed 80 and/or with a control unit 131 arranged on the transport means 13. The data exchange can take place via a wired connection or wirelessly.

The present invention relates to a device 1 and a method for reversibly connecting a rehabilitation mechanism 30 to a bed 80, in particular to a hospital bed that is preferably designed to be able to be brought to a vertical position. The device 1 at least comprises: at least one connection element 31 arranged on the rehabilitation mechanism 30; at least one receiving unit 12, which can be arranged at the side of and/or at the foot end 801 of the bed 80; wherein the receiving unit 12 corresponds in design to the connection element 31; and a rigid or preferably height-adjustable transport means 13 for transporting the rehabilitation mechanism 30 toward a rigid or preferably height-adjustable bed 80 and away from the bed 80. The invention further relates to a method for operating a rehabilitation mechanism 30 connected to a bed 80 by means of a device 1 according to the invention. The invention advantageously enables easy, fast, reversible connection of a rehabilitation mechanism 30 to a conventional hospital bed 80, in particular a hospital bed that can be brought to a vertical position. The invention is also suitable in particular for quickly and economically retrofitting existing beds 80 with a robot system for kinesiotherapy.

LIST OF REFERENCE SIGNS

- 1 device
- 11 connection frame
  - 111 longitudinal side of the connection frame 11
  - 112 transverse side of the connection frame 11
  - 113 pivot axis
  - 114 locking plate
  - 115 wing element
- 12 receiving unit
  - 121 locking device
    - 1211 stamp element
    - 1212 spring element
  - 122 opening
    - 1221 inner face
  - 123 means for exchanging information with a verticalization mechanism of the bed 80
- 13 transport means (trolley)
  - 131 control unit
  - 132 holding element for the anti-tipping device 32
  - 133 support frame
    - 1331 height adjuster for the support frame 133
  - 134 trigger means
  - 135 centering means
- 30 rehabilitation mechanism
- 31 connection element
- 32 anti-tipping device
- 80 bed, in particular: care bed, hospital bed, sickbed or intensive care bed
  - 801 foot end (end of the bed 80)
- 81 transverse side
- 82 longitudinal side
- 85 longitudinal axis
- V1 first connection position
- V2 second connection position
- V3 third connection position
- T transport position

The invention claimed is:

1. A device for reversibly connecting a rehabilitation mechanism to a bed, the device comprising:

at least one connection element arranged on the rehabilitation mechanism;

a connection frame mounted to a transverse side of the bed and extending at least along a portion of the transverse side, said connection frame being mounted pivotably about a pivot axis with respect to the one or more receiving units;

at least one receiving unit arranged at a side of the bed and/or at a foot end of the bed, said at least one receiving unit having a design corresponding to a design of said at least one connection element;

said at least one receiving unit or, if said at least one receiving unit is one of a plurality of receiving units, at least one of said receiving units comprises a locking device configured to enter into an operative connection with said connection frame;

a transport device for transporting the rehabilitation mechanism toward the bed and away from the bed;

wherein at least one of said transport device or the bed is height-adjustable;

a trigger being arranged on the transport device, for directly or in directly interacting with the at least one receiving unit or, if said at least one receiving unit is one of said plurality of receiving units, with at least one receiving unit;

said transport device being configured for selectively releasing or fixing the rehabilitation mechanism by interacting with said at least one receiving unit or, if said at least one receiving unit is one of said plurality of receiving units, with at least one of said plurality of receiving units;

in order to unlock the receiving unit, the trigger is configured to press against said connection frame when the bed is approached, and in order to lock the receiving unit while the transport device is moving away from the bed, the pressure which the trigger exerts on the locking device, which is operatively connected to the connection frame, is configured to decrease.

2. The device according to claim 1, wherein:

said at least one connection element is one of two connection elements arranged on the rehabilitation mechanism; and said at least one receiving unit is one of two receiving units to be arranged on opposite sides of a longitudinal axis of the bed.

3. The device according to claim 1, wherein
   said at least one receiving unit is a plurality of receiving units, and said connection frame firmly connects two of said plurality of receiving units to each other.

4. The device according to claim 1, wherein said connection frame comprises at least one locking plate.

5. The device according to claim 4, wherein said at least one locking plate is disposed centrally with respect to a longitudinal extent of said connection frame.

6. The device according to claim 1, wherein the at least one receiving unit or, if said at least one receiving unit is one of said plurality of receiving units, at least one of said receiving units has an opening for receiving the at least one connection element of the rehabilitation mechanism.

7. The device according to claim 6, wherein said opening is a downwardly tapering opening.

8. The device according to claim 6, wherein said opening has an inner face directed toward the bed, and the inner face is made of a plastic or is coated with a plastic.

9. The device according to claim 1, wherein said locking device comprises at least one stamp element and a spring element, and wherein:
   said stamp element is configured for operative connection to said connection frame and to said at least one connection element of the rehabilitation mechanism; and
   said spring element is configured to interact with said stamp element.

10. The device according to claim 1, wherein the bed is a hospital bed configured to be brought to a vertical position and said at least one receiving unit has at least one communications device for exchanging information with a verticalization mechanism of the bed and for interacting directly or indirectly with said at least one connection element of the rehabilitation mechanism.

11. The device according to claim 1, wherein said transport device comprises:
   a rigid or height-adjustable support frame for supporting the rehabilitation mechanism.

12. The device according to claim 1, wherein said transport device comprises at least one of the following:
   a centering device for centering said transport device with respect to the bed;
   a holding element for interacting with an anti-tipping device of the rehabilitation mechanism; or
   a control unit configured to exchange control signals with the rehabilitation mechanism.

13. The device according to claim 1,
   wherein the bed is a hospital bed, and the device is configured for interaction with the hospital bed that is enabled to be brought into a vertical position.

14. A method for operating a rehabilitation mechanism connected to a bed, the method comprising:
   providing a device according to claim 1, with the transport device having at least one control unit configured to exchange control signals with the rehabilitation mechanism, and with the at least one receiving unit having a communications device for exchanging information with a verticalization mechanism of the bed, and which is configured to interact directly or indirectly with the at least one connection element of the rehabilitation mechanism;
   the method further comprising:
      the rehabilitation mechanism exchanging information, the information being control data, with the verticalization mechanism of the bed via a direct interaction between the at least one connection element arranged on the rehabilitation mechanism and the at least one receiving unit arranged at the side and/or at the foot end of the bed; or
   the rehabilitation mechanism exchanging information, the information being control data, with the verticalization mechanism of the bed, and with the control unit arranged on the transport device, via the direct interaction between the at least one connection element arranged on the rehabilitation mechanism and the at least one receiving unit arranged at the side and/or at the foot end of the bed.

15. The method according to claim 14, wherein the bed is a hospital bed that can be brought into a vertical position.

16. A method for reversibly connecting a rehabilitation mechanism to a bed, the method comprising:
   arranging the rehabilitation mechanism on a height-adjustable transport device and transporting the rehabilitation mechanism in a transport position to the bed, wherein the bed is height-adjustable;
   moving the rehabilitation mechanism to a first connection position, aided by adjusting a height of the height-adjustable transport device or the height-adjustable bed;
   moving the rehabilitation mechanism from the first connection position to a second connection position by the height-adjustable transport device and/or by the height-adjustable bed, wherein the height-adjustable transport device interacts with at least one receiving unit, is arranged at a side and/or at a foot end of the height-adjustable bed, in order to unlock the receiving unit;
   unlocking the receiving unit by pressing a trigger arranged on the height-adjustable transport device, when approaching the height-adjustable bed, against a connection frame which is mounted to a transverse side of the height-adjustable bed, extending at least along a portion of the transverse side, and being mounted such that the connection frame can pivot about a pivot axis with respect to the one or more receiving units;
   moving the rehabilitation mechanism from the second connection position to a third connection position with the height-adjustable transport device or the height-adjustable bed;
   wherein at least one connection element arranged on the rehabilitation mechanism comes into operative connection with the at least one receiving unit or, in the case of the at least one receiving unit being a plurality of receiving units, with at least one receiving unit of the plurality of receiving units;
   moving the height-adjustable transport device and/or the height-adjustable bed from the third connection position to the transport position; and
   moving the height-adjustable transport device away from the bed, and whereby in order to lock the receiving unit while the height-adjustable transport device is moving away from the bed, increasing the pressure which the trigger exerts on the locking device, which is operatively connected to the connection frame.

17. The method according to claim 16, wherein the height-adjustable bed is a hospital bed that can be brought into a vertical position.

* * * * *